(No Model.)
J. W. TURNBULL.
SHADE SUPPORTING DEVICE.
No. 554,552. Patented Feb. 11, 1896.
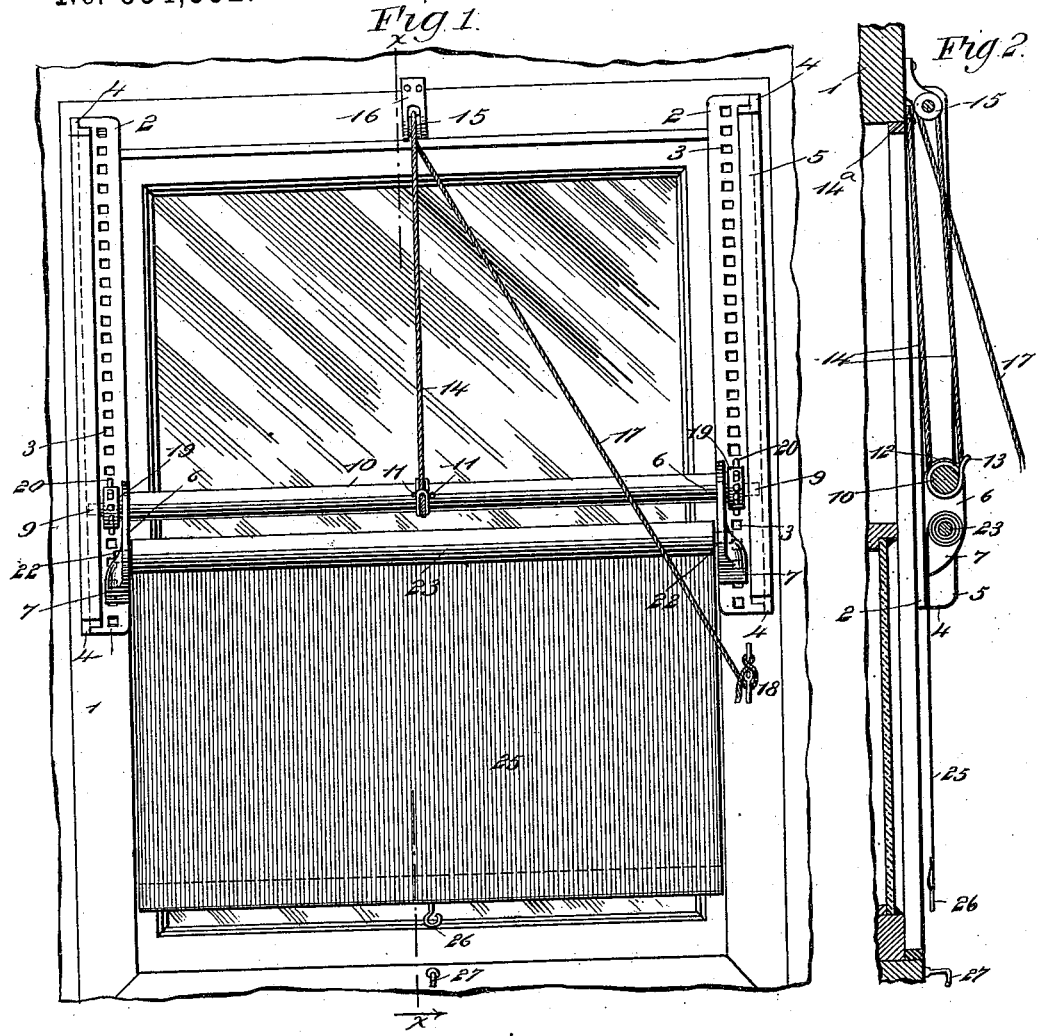
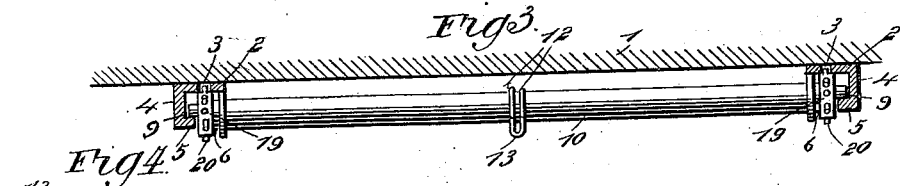
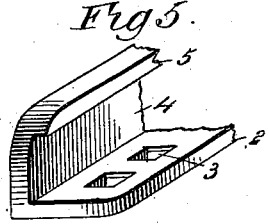
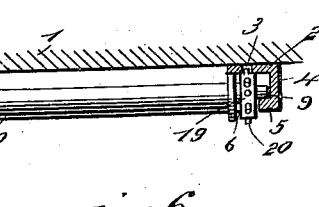
WITNESSES:
INVENTOR
J. W. Turnbull
BY
Munn & Co.
ATTORNEYS.

UNITED STATES PATENT OFFICE.

JOSEPH WALTER TURNBULL, OF NEW ORLEANS, LOUISIANA.

SHADE-SUPPORTING DEVICE.

SPECIFICATION forming part of Letters Patent No. 554,552, dated February 11, 1896.

Application filed May 14, 1895. Serial No. 549,292. (No model.)

*To all whom it may concern:*

Be it known that I, JOSEPH WALTER TURNBULL, of New Orleans, in the parish of Orleans and State of Louisiana, have invented a new and Improved Shade-Supporting Device, of which the following is a full, clear, and exact description.

This invention relates to certain improvements in devices for supporting window-shades and the like, and has for its object to provide a supporting device of a simple and inexpensive character, adapted for convenient and easy operation and not liable to become deranged or broken, which shall be adapted to support a shade-roller or equivalent device adjustably in position at any point on a window-frame or the like.

The invention comprises rack-bars adapted to be secured along the side rails of a window-frame and provided with vertical guideways wherein are arranged to slide bearing-blocks, wherein is journaled at its opposite ends a shaft extending transversely across the window-opening, and provided with gears at its ends to engage the respective rack-bars, the said bearing-blocks, in connection with the said shaft, forming a supporting-frame wherein is journaled the shade-roller or its equivalent, said frame being provided with means for raising and lowering it and for holding it in position when adjusted.

The invention also contemplates certain novel details of construction and combinations of parts whereby certain important advantages are attained and the supporting device made better adapted for use than other similar devices heretofore employed, all as will be hereinafter set forth.

The novel features of the invention will be carefully defined in the claims.

Reference is to be had to the accompanying drawings, forming a part of this specification, in which similar characters of reference indicate corresponding parts in all the views.

Figure 1 is a face view of a window-casing provided with a shade-supporting device in place thereon constructed in accordance with my invention. Fig. 2 is a vertical sectional view taken in the plane indicated by the line $x\ x$ in Fig. 1. Fig. 3 is a transverse section taken through the window-casing, showing the rack-bars and guides of the supporting device in transverse section and the supporting-frame of the shade-roller in plan view. Fig. 4 is a fragmentary perspective view drawn to an enlarged scale and illustrating a detail of construction of the shaft employed for tying the slide-blocks at opposite sides of the supporting device together. Fig. 5 is a fragmentary perspective view drawn to an enlarged scale, showing the construction of the rack-bars and their guides; and Fig. 6 is a perspective view drawn to an enlarged scale, showing the form of the slide-blocks.

In the views, 1 represents the casing of a window, and 2 2 represent the rack-bars secured in vertical position along the opposite side rails of said casing and provided with longitudinal series of perforations 3, forming rack-surfaces. At their outer edges the rack-bars 2 are provided with angular projecting flanges 4, the upper ends or edges of which are turned over inwardly toward one another, as indicated at 5 in the drawings, to form vertical guideways, said guideways, together with the longitudinal series of perforations 3, being parallel with one another.

6 6 represent the slide-blocks, one of which is arranged at each side of the window and adapted to play over the outer surface of the rack-bar 2 at that side of the casing, and said slide-blocks 6 are provided at their lower ends with enlargements 7, forming weights, and at their opposite upper ends with perforations 8, adapted to form bearings or journals for the projecting reduced ends 9 of the transverse shaft 10, employed for tying the said slide-blocks together, said shaft extending transversely across the window-opening in the casing 1, and being provided at its central portion with projecting pins or lugs 11, spaced apart and adapted to receive loosely between them a retaining device, (clearly shown in Fig. 4,) being formed of a piece of wire having its ends 12 bent or coiled about the said shaft 10, between the pins 11, and its central portion 13 bent outward from said shaft and adapted to receive and form a guide for a cord 14, one end of which is secured, as seen at 14ª, to the top sill of the casing 1, said cord being thence passed downwardly around the shaft 10, between the bent ends 12 of the retaining device, and upwardly over a pulley 15, secured in a bracket 16, located at the top sill of the casing 1, whence the end 17 of said cord is passed downwardly and adapted to be secured to a cleat 18 or similar retaining device secured to the side rail of the casing 1 below one of the rack-bars 2.

The transverse shaft 10 is held at its ends against withdrawal from its journals 8 in the slide-blocks 6 by means of gears 19, secured on the ends of said shaft outside the said slide-blocks, as seen in Figs. 1 and 3, and said gears 19 are provided with projecting teeth 20, adapted to enter and engage the perforations 3 in the vertical rack-bars 2, above referred to, the ends 9 of the reduced portions of the shaft 10 being arranged to project, as appears in Figs. 1 and 3, to such a distance beyond the said gears 19 as to engage under the inturned outer edges 5 of the flanges 4 of the rack-bars 2 in such a way that the supporting-frame of the device, comprising the slide-blocks 6 and the transverse shaft 10, is guided vertically in its movements.

At its lower part each of the slide-blocks 6 is provided with a second perforation or bearing 21 to receive the projecting journal 22 of the shade-roller 23, which, as is seen in Figs. 1 and 2, extends transversely across the window, extending immediately beneath and parallel to the transverse shaft 10, and to said shade-roller is secured the upper edge of a shade 25, provided at its lower part with an eye 26, adapted to engage a hook or similar device 27, secured in the bottom sill of the window-casing 1, whereby when said shade is drawn down to its lowest position to shade the lower part of the window it may be secured in place.

The slide-blocks 6 may, if desired, be provided on the under side of their weighted lower portions 7 with projections 28, adapted to engage and enter the respective perforations 3 in the rack-bars 2, along which said slide-blocks play; but this is not essential to my invention.

In operation, when it is desired to adjust the shade-supporting device, the end 17 of the cord 14 is disengaged from the cleat 18, and by means of said cord the transverse shaft 10 is raised or lowered, so as to elevate the shade-roller 23 to the proper position, the cord 14 being held against slipping longitudinally of the shaft 10 by means of the retaining device through which it passes, said retaining device being held against longitudinal movement on the said shaft by means of the pins 11. As the supporting-frame, comprising the transverse shaft 10 and the slide-blocks 6, is raised or lowered it will be guided by the engagement of the projecting reduced ends 9 of said shaft in the guideways of the vertical rack-bars 2, and will be caused to rotate freely by the engagement of the teeth 20 of the gears 19 with the vertical series of perforations 3 in said rack-bars. When the supporting-frame has been adjusted to the proper position over the window-opening, the shade 25 may be unwound or wound on the shade-roller 23 so as to properly shade the window.

When the teeth or projections 28 are employed on the weighted lower ends 7 of the slide-blocks 6, it is evident that said teeth will engage the perforations 3 in the respective rack-bars 2, so as to hold the supporting-frame against vertical movement, and when it is desired to disengage the said frame from the rack-bars it will only be necessary to draw down and outwardly upon the shade 25, so as to lift said projections or teeth out of the perforations 3, whereupon the supporting-frame may be raised and lowered to the proper position in the manner above described.

I do not wish to be understood as limiting myself to the employment of my improved shade-supporting device for use on windows, since it is evident that it may be employed for supporting shades and similar devices in any position, and it is also obvious that some modification may be made in the construction and arrangement of the device as herein set forth, and for this reason I do not wish to be understood as limiting myself to the precise form shown.

Having thus described my invention, I claim as new and desire to secure by Letters Patent—

1. The combination of vertical rack-bars adapted to be secured at opposite sides of a window-frame or the like, provided with parallel rack-faces, a supporting-frame comprising a transverse shaft and slide-blocks pivoted on opposite ends of said shaft and adapted to support a shade-roller, gears on the opposite ends of said shaft adapted to engage the rack-surfaces of the vertical rack-bars, and means for raising and lowering said supporting-frame, substantially as set forth.

2. The combination of vertical rack-bars adapted to be secured at opposite sides of a window-frame or the like and provided with parallel vertical rack-surfaces and guideways, a supporting-frame comprising a transverse shaft and slide-blocks secured to opposite ends thereof, said shaft having its opposite ends projecting outside of said slide-blocks and adapted to engage the guideways in the rack-bars, gears on said frame adapted to engage the rack-surfaces of the rack-bars, a shade-roller having its ends supported in the slide-blocks of said frame below said transverse shaft and means for raising and lowering said frame, substantially as set forth.

3. The combination of vertical rack-bars provided with rack-surfaces and guideways, a supporting-frame having engagement at its ends with said guideways and provided with gears to engage said rack-surfaces of the rack-bars, said frame comprising a transverse shaft and slide-blocks pivoted at the ends thereof and adapted to support the ends of a shade-roller and projections on said slide-blocks to engage said rack-surfaces of the rack-bars, substantially as set forth.

4. The combination of vertical rack-bars provided with rack-surfaces and having guideways parallel thereto, a supporting-frame comprising a transverse shaft and slide-blocks secured at opposite ends thereof and adapted to support a shade-roller, said transverse shaft having its ends reduced and adapted to engage the guides in the respective rack-bars, gears secured to the reduced ends of the shaft and adapted to engage the rack-surfaces in said rack-bars, a retaining device centrally located on said shaft, and consisting of a piece of wire having its ends bent parallel around said shaft and having its central part bent out from the shaft, pins on said shaft, on opposite sides of the said retaining device, and a cord passing through the bent central portion of said centrally-located retaining device and adapted to be operated to raise and lower the supporting-frame, substantially as set forth.

5. The combination of vertical rack-bars provided with rack-surfaces and guideways, a supporting-frame adapted to support a shade-roller or the like and provided with projections adapted to engage the guideways in the rack-bars, gears on said frame adapted to engage the rack-surfaces of said rack-bars, projections at opposite sides of the lower portion of said supporting-frame adapted to engage said rack-surfaces of the respective rack-bars, and means for raising and lowering said supporting-frame, substantially as set forth.

6. The combination of vertical rack-bars provided with rack-surfaces and guideways, a supporting-frame comprising a transverse shaft having its ends adapted to engage the guideways in the rack-bars, and slide-blocks pivoted on the ends of the said shaft and adapted to support a shade-roller, each of said slide-blocks being provided with a projection at its lower end adapted to engage the rack-surfaces of the rack-bars, gears on the ends of the said supporting-frame, and means for raising and lowering the said frame, substantially as set forth.

JOSEPH WALTER TURNBULL.

Witnesses:
BRISBANE MARSHALL TURNBULL,
JAMES FLETCHER TURNBULL.